United States Patent
Yang et al.

(10) Patent No.: US 10,845,772 B2
(45) Date of Patent: Nov. 24, 2020

(54) METHOD AND SYSTEM FOR CONTROLLING CLOTHING CARE MACHINE

(71) Applicants: FOSHAN SHUNDE MIDEA ELECTRICAL HEATING APPLIANCES MANUFACTURING CO., LIMITED, Foshan (CN); MIDEA GROUP CO., LTD., Foshan (CN)

(72) Inventors: Zhiqi Yang, Foshan (CN); Zhijiang He, Foshan (CN); Bo Xie, Foshan (CN)

(73) Assignees: FOSHAN SHUNDE MIDEA ELECTRICAL HEATING APPLIANCES MANUFACTURING CO., LIMITED., Foshan (CN); MIDEA GROUP CO., LTD., Foshan (CN)

( * ) Notice: Subject to any disclaimer, the term of this patent is extended or adjusted under 35 U.S.C. 154(b) by 307 days.

(21) Appl. No.: 15/525,744

(22) PCT Filed: Oct. 27, 2015

(86) PCT No.: PCT/CN2015/092980
§ 371 (c)(1),
(2) Date: May 10, 2017

(87) PCT Pub. No.: WO2016/078499
PCT Pub. Date: May 26, 2016

(65) Prior Publication Data
US 2017/0364049 A1    Dec. 21, 2017

(30) Foreign Application Priority Data

Nov. 22, 2014   (CN) .......................... 2014 1 0683098
Nov. 22, 2014   (CN) .......................... 2014 1 0683110
(Continued)

(51) Int. Cl.
G05B 19/042     (2006.01)
D06F 75/14      (2006.01)
(Continued)

(52) U.S. Cl.
CPC .......... G05B 19/042 (2013.01); D06F 73/00 (2013.01); D06F 75/14 (2013.01); D06F 75/24 (2013.01);
(Continued)

(58) Field of Classification Search
CPC .......... D06F 75/14; D06F 75/24; D06F 75/26; D06F 75/12; D06F 73/00; D06F 87/00; G05B 19/042; G05B 2219/2633
See application file for complete search history.

(56) References Cited

U.S. PATENT DOCUMENTS 5,290,998 A * 3/1994 Couch ..................... D06F 71/29
                                                       219/247
5,380,983 A * 1/1995 Cavada .................. D06F 75/26
                                                       219/250
(Continued)

FOREIGN PATENT DOCUMENTS

CN        101824740        9/2010
CN        102021807        4/2011
(Continued)

OTHER PUBLICATIONS

World Intellectual Property Organization (WIPO) International Search Report for PCT/CN2015/0902980 dated Jan. 27, 2016 6 Pages.
(Continued)

*Primary Examiner* — Benjamin L Osterhout
(74) *Attorney, Agent, or Firm* — Anova Law Group PLLC

(57) ABSTRACT

A clothing care machine and a method and system for controlling the same are provided. The clothing care
(Continued)

machine is provided with a steam generator and a steam handle. The steam handle is provided with a human body sensing component. The method includes: controlling the human body sensing component to sense whether the steam handle is operated by a user; and controlling an operation state of the steam generator according to a touch signal sensed by the human body sensing component. The method may realize an intelligent control of the steam generator according to an operation condition of the user.

20 Claims, 3 Drawing Sheets

(30) Foreign Application Priority Data

| Nov. 22, 2014 | (CN) | 2014 1 0683140 |
|---|---|---|
| Nov. 22, 2014 | (CN) | 2014 2 0707833 U |
| Nov. 22, 2014 | (CN) | 2014 2 0713591 U |
| Nov. 22, 2014 | (CN) | 2014 2 0713613 U |

(51) Int. Cl.

| D06F 75/24 | (2006.01) |
|---|---|
| D06F 73/00 | (2006.01) |
| D06F 75/26 | (2006.01) |
| D06F 87/00 | (2006.01) |
| D06F 75/12 | (2006.01) |

(52) U.S. Cl.
CPC .............. *D06F 75/26* (2013.01); *D06F 75/12* (2013.01); *D06F 87/00* (2013.01); *G05B 2219/2633* (2013.01)

(56) References Cited

U.S. PATENT DOCUMENTS

| 6,079,133 | A | * | 6/2000 | Netten | D06F 75/18 |
| | | | | | 38/77.7 |
| 6,307,182 | B1 | * | 10/2001 | Lile | D06F 75/26 |
| | | | | | 219/251 |
| 8,146,275 | B2 | * | 4/2012 | Lee | D06F 75/20 |
| | | | | | 38/77.6 |
| 2002/0029498 | A1 | * | 3/2002 | Harrison | D06F 75/34 |
| | | | | | 38/75 |
| 2006/0254097 | A1 | * | 11/2006 | Alipour | D06F 75/40 |
| | | | | | 38/2 |
| 2010/0122478 | A1 | * | 5/2010 | Lee | D06F 75/12 |
| | | | | | 38/77.7 |
| 2015/0198940 | A1 | * | 7/2015 | Hwang | D06F 39/005 |
| | | | | | 700/90 |

FOREIGN PATENT DOCUMENTS

| CN | 201864984 U | 6/2011 |
| CN | 201873855 | 6/2011 |
| CN | 201873885 | 6/2011 |
| CN | 202298263 | 7/2012 |
| CN | 202644245 U | 1/2013 |
| CN | 203683966 U | 7/2014 |
| CN | 204435023 | 7/2015 |
| CN | 204491282 | 7/2015 |
| CN | 204644727 | 9/2015 |
| JP | H02136191 | 5/1990 |
| JP | H04114699 A | 4/1992 |
| JP | H08280786 A | 10/1996 |
| JP | 2001507271 | 6/2001 |
| JP | 2013536699 A | 9/2013 |
| JP | 2014500115 | 1/2014 |
| KR | 20110015145 | 2/2011 |
| KR | 101436760 | 9/2014 |
| WO | 2005014917 | 2/2005 |
| WO | 2010060695 | 6/2010 |
| WO | 2011066740 | 6/2011 |

OTHER PUBLICATIONS

The Intellectual Property Office of Indonesia (IPID) The First Office Action for Indonesia Application No. P00201703371 dated Jul. 10, 2019 2 Pages (Translation included).
Japan Patent Office Reasons for Refusal dated Mar. 5, 2019 8 Pages (including English translation).
JPO, Office Action for JP Application No. 2017526971, dated Jun. 22, 2018.
KIPO, Office Action for KR Application No. 20177009404, dated Jun. 25, 2018.
EPO, Office Action for EP Application No. 15861144, dated Jun. 11, 2018.
The State Intellectual Property Office of People's Republic of China, First Office Action for CN201410683098.5, dated Jun. 29, 2017.
The State Intellectual Property Office of People's Republic of China, First Office Action for CN201410683110.2, dated May 18, 2017.
The State Intellectual Property Office of People's Republic of China, First Office Action for CN201410683140.3, dated Apr. 21, 2017.
The State Intellectual Property Office of People's Republic of China, Second Office Action for CN201410683110.2, dated Nov. 8, 2017.
Japan Patent Office Reasons for Refusal for Japanese Application No. 2017526971 dated Nov. 5, 2019 11 Pages (including English translation).
The Intellectual Property Office of India (IPI) the Office Action for India Application No. 201737008955 dated Nov. 18, 2019 6 Pages (Translation Included ).

* cited by examiner

US 10,845,772 B2

METHOD AND SYSTEM FOR CONTROLLING CLOTHING CARE MACHINE

CROSS REFERENCE TO RELATED APPLICATION

This application is a U.S. national phase application based on an International Application Serial No. PCT/CN2015/092980, which claims priority and benefits of Chinese Patent Application Serial Nos. 201410683140.3, 201410683110.2, 201410683098.5, 201420713613.5, 201420707833.7 and 201420713591.2, filed with State Intellectual Property Office on Nov. 22, 2014, the entire contents of which are incorporated herein by reference.

FIELD

The present disclosure relates to a technical field of clothing care machine, and more particularly, to a method for controlling a clothing care machine, a system for controlling a clothing care machine, and a clothing care machine.

BACKGROUND

In the related art, as an important domestic appliance, a clothing care machine is used quite often. In the process of ironing clothing, the clothing care machine may keep heating the water in a steam generator to generate plenty of water vapor and transfer it to an ironing board through a steam pipe. This kind of traditional clothing care machine has the following defects.

(1) It may lead to power consumption if the clothing care machine may keep heating when a user arranges the clothing to be ironed;

(2) When the user forgets to turn off the clothing care machine, the steam generator will continue to heat and the water may be easily dried out, while the high temperature of a main body of the clothing care machine may lead to an electrical fire, and both the personal and property safety of the user may be under a great threat;

(3) During the process of ironing, there is no prompt to inform the user about a current operating state of the clothing care machine such as whether the steam generator has finished heating, thus a lot of time may be wasted on waiting.

Therefore, how to design the clothing care machine and a method for controlling the same so as to achieve an intelligent control process of the steam generator according to an operation state of the user becomes a critical technical problem to be solved.

SUMMARY

A method for controlling a clothing care machine is provided according to embodiments of the present disclosure. The method includes: controlling a human body sensing component to sense whether a steam handle is operated by a user; controlling an operation state of a steam generator according to a touch signal sensed by the human body sensing component.

According to embodiments of the present disclosure, a system for controlling a clothing care machine is also provided, which includes: a control unit, configured to control the human body sensing component to sense whether the steam handle is operated by a user; the control unit is also configured to control an operation state of the steam generator according to a touch signal sensed by the human body sensing component.

According to embodiments of the present disclosure, a clothing care machine is also provided, which includes the system for controlling a clothing care machine according to any one of the above technical solutions.

According to embodiments of the present disclosure, a clothing care machine is provided, which includes: a steam generator, provided with a heating driver component; a steam handle, provided with a human body sensing component, in which the human body sensing component is configured to sense whether the steam handle is operated by a user in real time; a microprocessor, coupled to the steam handle and the heating driver component, and configured to control an operation state of the heating driver component according to a touch signal sensed by the human body sensing component in real time; a wireless communication component, coupled between the microprocessor and the heating driver component via a wireless communication network, and configured to transmit a control instruction from the microprocessor to the heating driver component.

According to embodiments of the present disclosure, a clothing care machine is provided, which includes: a steam generator, provided with a power supply battery component, in which the steam generator is configured to heat water and to generate vapor; a steam handle, provided with a human body sensing component, in which the human body sensing component is configured to sense whether the steam handle is operated by a user, and the power supply battery component is configured to supply power to the steam handle; a control unit, coupled between the steam handle and steam generator, and configured to control an operation state of the steam generator according to a touch signal sensed by the human body sensing component.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or other aspects and advantages of the present disclosure will become apparent and more readily appreciated from the following descriptions of the embodiments with reference to the drawings, in which.

REFERENCE SIGNS IN FIG. 1 TO 3 AND THE CORRESPONDING STRUCTURE NAMES

1 steam generator, 2 steam handle, 201 upper cover, 202 control unit, 203 fastening structure, 204 prompting device, 205 steam handle switch, 206 human body sensing component, 207 anti-skidding section, 208 lower cover, 209 ironing board, 3 gear adjusting switch, 4 steam pipe, 5 water inlet, 6 clothes hanger, 7 support frame, 71 lengthening pole.

DETAILED DESCRIPTION

In order to make the above objectives, features, and advantages of the present disclosure more easily to appreciate, descriptions of the present disclosure will be made in detail with reference to drawings and specific embodiments as followings. It should be noted that different embodiments or characters of different embodiments of the present disclosure may be combined or associated, as long as there are no contradictories.

Although some specific approaches are provided in the description for illustrating the present disclosure, other different embodiments may also be adopted by the present disclosure. Therefore the scope of the present disclosure shall not be limited by embodiments disclosed hereafter.

Figure 4:
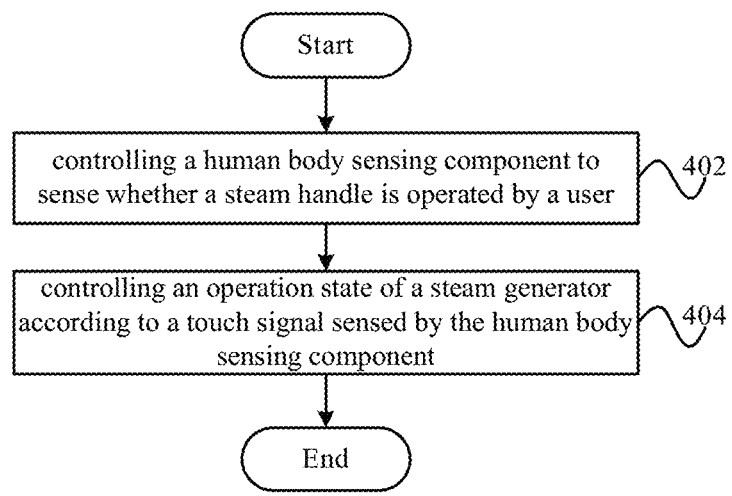
FIG. 4 shows a flow chart of a method for controlling a clothing care machine according to an embodiment of the present disclosure.

FIG. 4 shows a flow chart of a method for controlling a clothing care machine according to an embodiment of the present disclosure.

As shown in FIG. 4, the method for controlling a clothing care machine according to an embodiment of the present disclosure includes: step 402, controlling a human body sensing component to sense whether a steam handle is operated by a user; step 404, controlling an operation state of a steam generator according to a touch signal sensed by the human body sensing component.

With the method for controlling a clothing care machine according to embodiments of the present disclosure, via controlling the operation state of the steam generator according to the touch signal sensed by the human body sensing component, a process of intelligent control of the steam generator according to the operation state of the user is controlled to be achieved, and the power consumption and water loss of the clothing care machine are reduced at the same time, and the user operation experience is improved. Ways of sensing include real-time sensing and timing sensing. The real-time sensing is to collect information about the operation state of the user during a working process of the human body sensing component, while the timing sensing is to pre-store a sensing time and an interval of time in an electronic control component of the clothing care machine. Comparing to the real-time sensing, the way of the timing sensing further reduces the power consumption of the clothing care machine.

In particular, the steam generator is configured to heat water. The human body sensing component on the hand shank may be configured to sense whether a hand of the user is separate from the hand shank, and to transform the sensed situation to the touch signal. The control unit is configured to send a control instruction of the steam generator according to the duration of the touch signal. The human body sensing component includes one of a single circuit element, a single sensor, and a sensor array and any combination thereof. When the single circuit element (such as a metal sheet, a PCB component, a conductive medium, etc.) is used as a sensor unit of the human body sensing component, the sensing principle is that the touch signal is generated according to the changing of electrical parameter(s) of the human body sensing component during the contact process of the human body sensing component and a human body. Besides, when a plurality of single sensors with different principles are used to sense at the same time, the sensing process may be more accurate. In particular, assuming that a temperature sensor and a pressure sensor are sensed together, when the temperature sensor senses that a touch temperature signal is belonged to a human temperature signal, the steam generator will be controlled to operate only after the pressure sensor further senses that a touch pressure signal is belonged to a human pressure signal. When a plurality of single sensors with different principles are used to sense separately, this may achieve diversity in sensing process. Choosing single sensors to sense alone or together at the same time may be realized via user preset instructions, such that individual requirements of users may be satisfied and the operation experience is improved.

Moreover, the method for controlling a clothing care machine according to above embodiments of the present disclosure may have the following additional technical features.

According to an embodiment of the present disclosure, controlling the human body sensing component to sense whether the steam handle is operated by a user includes: obtaining a mechanical turn-on instruction of a mechanical switch of the clothing care machine; triggering the human body sensing component to sense whether the steam handle is operated by the user after the mechanical turn-on instruction is obtained; obtaining a mechanical turn-off instruction of the mechanical switch of the clothing care machine; controlling the steam generator to stop heating after the mechanical turn-off instruction is obtained.

With the method for controlling a clothing care machine according to embodiments of the present disclosure, via triggering the human body sensing component to perform real-time sense according to the mechanical turn-on instruction of the mechanical switch and via controlling the steam generator to stop heating according to the mechanical turn-off instruction of the mechanical switch, operation requirements of the user may be more adapted. In particular, a steam handle switch may be connected to a power line of the human body sensing component in series. When the steam handle switch is turned on, the human body sensing component is powered on and begin to work for sensing whether the steam handle is operated by the user; when the steam handle switch is turned off, the control unit cannot receive signals from the human body sensing component or receives a mechanical signal of the steam handle switch, hence sends a stop heating instruction to a heating driver device.

According to an embodiment of the present disclosure, the human body sensing component includes an infrared sensor. Controlling an operation state of the steam generator according to a touch signal sensed by the human body sensing component includes: after a human characteristic infrared signal is sensed by the infrared sensor, determining whether a duration of the characteristic infrared signal is longer than or equal to a first preset touch duration, in which, the characteristic infrared signal includes a human temperature infrared signal and/or a human movement infrared signal; when determining that the duration of the characteristic infrared signal is longer than or equal to the first preset touch duration, sending a heating instruction to control the steam generator to heat.

With the method for controlling a clothing care machine according to embodiments of the present disclosure, via controlling the steam generator to heat after obtaining the human characteristic infrared signal and determining that the duration of the signal is longer than the first preset touch duration, error signals generated by infrared signals of other objects in the human body sensing component is avoid, therefore a wrong heating control of the steam generator from the human body sensing component which is caused by the error signals is reduced, the waste of power of the steam generator is avoided. In particular, an infrared radiation corresponding to human body temperature signals may be detected. Because there are hardly any objects with temperature close to human body temperature, an accurate detection of human signals may be achieved.

According to an embodiment of the present disclosure, the human body sensing component includes a pressure sensor. Controlling an operation state of the steam generator according to a touch signal sensed by the human body sensing component includes: after a human pressure signal is sensed by the pressure sensor, determining whether a duration of the pressure signal is longer than or equal to a first preset touch duration, in which, the pressure signal includes one of a pressure range signal, a pressure value signal and a pressure direction signal and any combination thereof; when determining that the duration of the pressure signal is longer than or equal to the first preset touch duration, sending a heating instruction to control the steam generator to heat.

With the method for controlling a clothing care machine according to embodiments of the present disclosure, via controlling the steam generator to heat after obtaining the human pressure signal and determining that the duration of the signal is longer than the first preset touch duration, error signals generated by pressure signals of other objects in the human body sensing component is avoid, therefore a wrong heating control of the steam generator from the human body sensing component which is caused by the error signals is reduced, the waste of power of the steam generator is avoided. In particular, a size of a region applied with pressure and/or a value of pressure may be detected when the user is handling the steam handle. Because there are hardly any objects having the same shape and size of a human hand, an accurate detection of human signals may be achieved.

According to an embodiment of the present disclosure, the human body sensing component includes an electrical sensor. Controlling an operation state of the steam generator according to a touch signal sensed by the human body sensing component includes: after a human electric signal is sensed by the electrical sensor, determining whether a duration of the electric signal is longer than or equal to a first preset touch duration, in which, the electric signal includes one of a human electric potential signal, a human impedance signal, and a human bio-electrical signal and any combination thereof; when determining that the duration of the electric signal is longer than or equal to the first preset touch duration, sending a heating instruction to control the steam generator to heat.

With the method for controlling a clothing care machine according to embodiments of the present disclosure, via controlling the steam generator to heat after obtaining the human electrical signal and determining that the duration of the signal is longer than the first preset touch duration, error signals generated by electrical signals of other objects in the human body sensing component is avoid, therefore a wrong heating control of the steam generator from the human body sensing component which is caused by the error signals is reduced, the waste of power of the steam generator is avoided. For example, as a kind of good conductor, the potential of a human body may be considered as zero, as while as the human body touches the hand shank the potential difference of the human body sensing component on the hand shank is changed, thus an operation is triggered to control the control unit to control the steam generator to heat.

According to an embodiment of the present disclosure, the method further includes: determining whether a free duration when the steam handle has not been sensed to be operated by any user is longer than or equal to a second preset touch duration; when determining that the free duration is longer than or equal to the second preset touch duration, sending a stop heating instruction to control the steam generator to stop heating; and when determining that the touch duration is longer than or equal to the first preset touch duration and the free duration is longer than or equal to the second preset touch duration, sending a heat preservation instruction to control the steam generator to enter into a standby state of heat preservation.

With the method for controlling a clothing care machine according to embodiments of the present disclosure, via triggering the control unit by a timer to send a stop heating instruction to make the steam generator to stop heating when determining that the free duration of the hand shank is longer than the second preset touch duration, the unnecessary waste of power is reduced, at the same time, the safe operation of the clothing care machine is ensured, and the risk of drying out of the water in the steam generator is advantageously reduced; and via sending a heat preservation instruction to control the steam generator to preserve heat when determining that the touch duration is longer than the first preset touch duration and the free duration is longer than the second preset touch duration, the power waste of the steam generator is reduced. In particular, during a process of turning on the clothing care machine and ironing clothing, the user may not keep holding the hand shank of the clothing care machine. If the heating process of the steam generator is stopped as soon as the hand shank of the clothing care machine is put down by the user, the temperature of the steam generator may drop very quickly and this may cause a reheating of the steam generator when the user operates the clothing care machine next time, and may lead to the waste of power consumption.

According to an embodiment of the present disclosure, the electrical sensor particularly includes one of a copper sheet, a printed circuit board, a conductive cotton, and a conductive aluminum foil and any combination thereof. The electrical sensor is provided at one or more positions of an outside part, a top part and a bottom part of the steam handle.

With the method for controlling a clothing care machine according to embodiments of the present disclosure, via configuring the electrical sensor with one of the copper sheet, the printed circuit board, the conductive cotton, and the conductive aluminum foil and any combination thereof, the production cost and test sensitivity of the human body sensing component is advantageously reduced. In particular, via providing the conductive aluminum foil and/or the copper sheet at the outside part of the steam handle, since a human body is a good conductor and therefore may be considered to be with a potential equal to ground, when the human body touches the conductive aluminum foil and/or the copper sheet of the steam handle, the potential of the human body sensing component on the hand shank is changed, and when detecting that the duration of the changed potential runs up to the preset touch duration, the steam generator is triggered to operate. Besides, the production of the conductive aluminum foil costs very cheap price and is compatible with current manufacture methods and suitable for technique spreading and quantity production.

Figure 5:
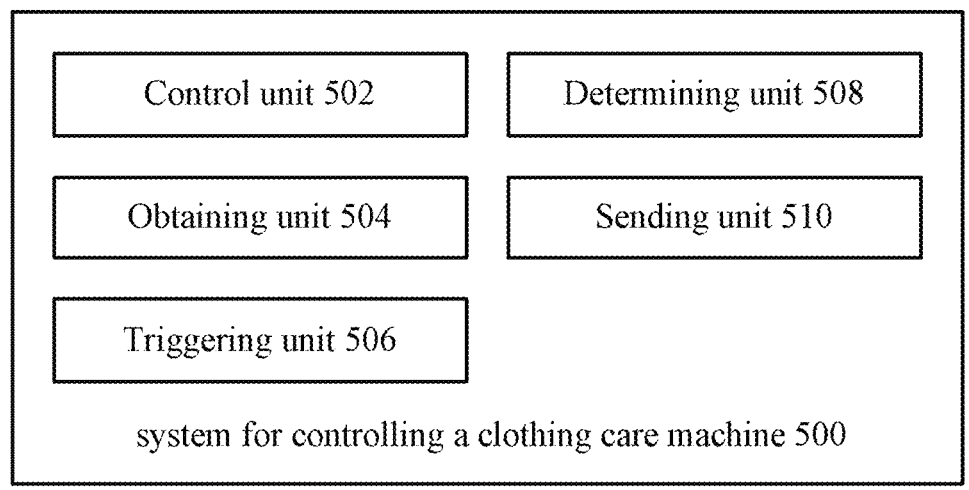
FIG. 5 shows a block diagram of a system for controlling a clothing care machine according to an embodiment of the present disclosure.

FIG. 5 shows a block diagram of a system for controlling a clothing care machine according to an embodiment of the present disclosure.

As shown in FIG. 5, the system 500 for controlling a clothing care machine according to an embodiment of the present disclosure includes: a control unit 502, configured to control the human body sensing component to sense whether the steam handle is operated by a user; the control unit 502 is also configured to control an operation state of the steam generator according to a touch signal sensed by the human body sensing component.

With the system for controlling a clothing care machine according to embodiments of the present disclosure, via controlling the operation state of the steam generator according to the touch signal sensed by the human body sensing component, a process of intelligent control of the steam generator according to the operation state of the user is controlled to be achieved, and the power consumption and water loss of the clothing care machine are reduced at the same time, and the user operation experience is improved. Ways of sensing include real-time sensing and timing sensing. The real-time sensing is to collect information about the operation state of the user during a working process of the human body sensing component, while the timing sensing is to pre-store a sensing time and an interval of time in an electronic control component of the clothing care machine. Comparing to the real-time sensing, the way of the timing sensing further reduces the power consumption of the clothing care machine.

In particular, the steam generator is configured to heat water. The human body sensing component on the hand shank may be configured to sense whether a hand of the user is separate from the hand shank, and to transform the sensed situation to the touch signal. The control unit is configured to send a control instruction of the steam generator according to the duration of the touch signal. The human body sensing component includes one of a single circuit element, a single sensor, and a sensor array and any combination thereof. When the single circuit element (such as a metal sheet, a PCB component, a conductive medium, etc.) is used as a sensor unit of the human body sensing component, the sensing principle is that the touch signal is generated according to the changing of electrical parameter(s) of the human body sensing component during the contact process of the human body sensing component and a human body. Besides, when a plurality of single sensors with different principles are used to sense at the same time, the sensing process may be more accurate. In particular, assuming that a temperature sensor and a pressure sensor are sensed together, when the temperature sensor senses that a touch temperature signal is belonged to a human temperature signal, the steam generator will be controlled to operate only after the pressure sensor further senses that a touch pressure signal is belonged to a human pressure signal. When a plurality of single sensors with different principles are used to sense separately, this may achieve diversity in sensing process. Choosing single sensors to sense alone or together at the same time may be realized via user preset instructions, such that individual requirements of users may be satisfied and the operation experience is improved.

According to an embodiment of the present disclosure, the system 500 further includes: an obtaining unit 504, configured to obtain a mechanical turn-on instruction of a mechanical switch of the clothing care machine; a triggering unit 506, configured to trigger the human body sensing component to sense whether the steam handle is operated by the user after the mechanical turn-on instruction is obtained; the obtaining unit 504 is also configured to obtain a mechanical turn-off instruction of the mechanical switch of the clothing care machine; the triggering unit 506 is also configured to control the steam generator to stop heating after the mechanical turn-off instruction is obtained.

With the system for controlling a clothing care machine according to embodiments of the present disclosure, via triggering the human body sensing component to perform real-time sense according to the mechanical turn-on instruction of the mechanical switch and via controlling the steam generator to stop heating according to the mechanical turn-off instruction of the mechanical switch, operation requirements of the user may be more adapted. In particular, a steam handle switch may be connected to a power line of the human body sensing component in series. When the steam handle switch is turned on, the human body sensing component is powered on and begin to work for sensing whether the steam handle is operated by the user; when the steam handle switch is turned off, the control unit cannot receive signals from the human body sensing component or receives a mechanical signal of the steam handle switch, hence sends a stop heating instruction to a heating driver device.

According to an embodiment of the present disclosure, the human body sensing component includes an infrared sensor, and the system includes: a determining unit 508, configured to, after a human characteristic infrared signal is sensed by the infrared sensor, determine whether a duration of the characteristic infrared signal is longer than or equal to a first preset touch duration, in which, the characteristic infrared signal includes a human temperature infrared signal and/or a human movement infrared signal; a sending unit 510, configured to send a heating instruction to control the steam generator to heat when determining that the duration of the characteristic infrared signal is longer than or equal to the first preset touch duration.

With the system for controlling a clothing care machine according to embodiments of the present disclosure, via controlling the steam generator to heat after obtaining the human characteristic infrared signal and determining that the duration of the signal is longer than the first preset touch duration, error signals generated by infrared signals of other objects in the human body sensing component is avoid, therefore a wrong heating control of the steam generator from the human body sensing component which is caused by the error signals is reduced, the waste of power of the steam generator is avoided. In particular, an infrared radiation corresponding to human body temperature signals may be detected. Because there are hardly any objects with temperature close to human body temperature, an accurate detection of human signals may be achieved.

According to an embodiment of the present disclosure, the human body sensing component includes a pressure sensor, and the system also includes: a determining unit 508, configured to, after a human pressure signal is sensed by the pressure sensor, determine whether a duration of the pressure signal is longer than or equal to a first preset touch duration, in which, the pressure signal includes one of a pressure range signal, a pressure value signal and a pressure direction signal and any combination thereof; a sending unit 510, configured to send a heating instruction to control the steam generator to heat when determining that the duration of the pressure signal is longer than or equal to the first preset touch duration.

With the system for controlling a clothing care machine according to embodiments of the present disclosure, via controlling the steam generator to heat after obtaining the human pressure signal and determining that the duration of the signal is longer than the first preset touch duration, error signals generated by pressure signals of other objects in the human body sensing component is avoid, therefore a wrong heating control of the steam generator from the human body sensing component which is caused by the error signals is reduced, the waste of power of the steam generator is avoided. In particular, a size of a region applied with pressure and/or a value of pressure may be detected when the user is handling the steam handle. Because there are hardly any objects having the same shape and size of a human hand, an accurate detection of human signals may be achieved.

According to an embodiment of the present disclosure, the human body sensing component includes an electrical sensor, and the system also includes: a determining unit 508, configured to, after a human electric signal is sensed by the electrical sensor, determine whether a duration of the electric signal is longer than or equal to a first preset touch duration, in which, the electric signal includes one of a human electric potential signal, a human impedance signal and a human bio-electrical signal and any combination thereof; a sending unit 510, configured to send a heating instruction to control the steam generator to heat when determining that the duration of the electric signal is longer than or equal to the first preset touch duration.

With the system for controlling a clothing care machine according to embodiments of the present disclosure, via controlling the steam generator to heat after obtaining the human electrical signal and determining that the duration of the signal is longer than the first preset touch duration, error signals generated by electrical signals of other objects in the human body sensing component is avoid, therefore a wrong heating control of the steam generator from the human body sensing component which is caused by the error signals is reduced, the waste of power of the steam generator is avoided. For example, as a kind of good conductor, the potential of a human body may be considered as zero, as while as the human body touches the hand shank the potential difference of the human body sensing component on the hand shank is changed, thus an operation is triggered to control the control unit to control the steam generator to heat.

According to an embodiment of the present disclosure, the determining unit 508 is further configured to determine whether a free duration when the steam handle has not been detected to be operated by any user is longer than or equal to a second preset touch duration; the sending unit 510 is further configured to send a stop heating instruction to control the steam generator to stop heating when determining that the free duration is longer than or equal to the second preset touch duration; and the sending unit 510 is further configured to send a heat preservation instruction to control the steam generator to preserve heat when determining that the touch duration is longer than or equal to the first preset touch duration and the free duration is longer than or equal to the second preset touch duration.

With the system for controlling a clothing care machine according to embodiments of the present disclosure, via triggering the control unit by a timer to send a stop heating instruction to make the steam generator to stop heating when determining that the free duration of the hand shank is longer than the second preset touch duration, the unnecessary waste of power is reduced, at the same time, the safe operation of the clothing care machine is ensured, and the risk of drying out of the water in the steam generator is advantageously reduced; and via sending a heat preservation instruction to control the steam generator to preserve heat when determining that the touch duration is longer than the first preset touch duration and the free duration is longer than the second preset touch duration, the power waste of the steam generator is reduced. In particular, during a process of turning on the clothing care machine and ironing clothing, the user may not keep holding the hand shank of the clothing care machine. If the heating process of the steam generator is stopped as soon as the hand shank of the clothing care machine is put down by the user, the temperature of the steam generator may drop very quickly and this may cause a reheating of the steam generator when the user operates the clothing care machine next time, and may lead to the waste of power consumption.

According to an embodiment of the present disclosure, the electrical sensor particularly includes one of a copper sheet, a printed circuit board, a conductive cotton, and a conductive aluminum foil and any combination thereof. The electrical sensor is provided at one or more positions of an out side part, a top part and a bottom part of the steam handle.

With the method for controlling a clothing care machine according to embodiments of the present disclosure, via configuring the electrical sensor with one of the copper sheet, the printed circuit board, the conductive cotton, and the conductive aluminum foil and any combination thereof, the production cost and test sensitivity of the human body sensing component is advantageously reduced. In particular, via providing the conductive aluminum foil and/or the copper sheet at the out side part of the steam handle, since a human body is a good conductor and therefore may be considered to be with a potential equal to ground, when the human body touches the conductive aluminum foil and/or the copper sheet of the steam handle, the potential of the human body sensing component on the hand shank is changed, and when detecting that the duration of the changed potential runs up to the preset touch duration, the steam generator is triggered to operate. Besides, the production of the conductive aluminum foil costs very cheap price and is compatible with current manufacture methods and suitable for technique spreading and quantity production.

A clothing care machine is also provided according to embodiments of the present disclosure and the structure of the above clothing care machine may include the following embodiments.

Figure 1:
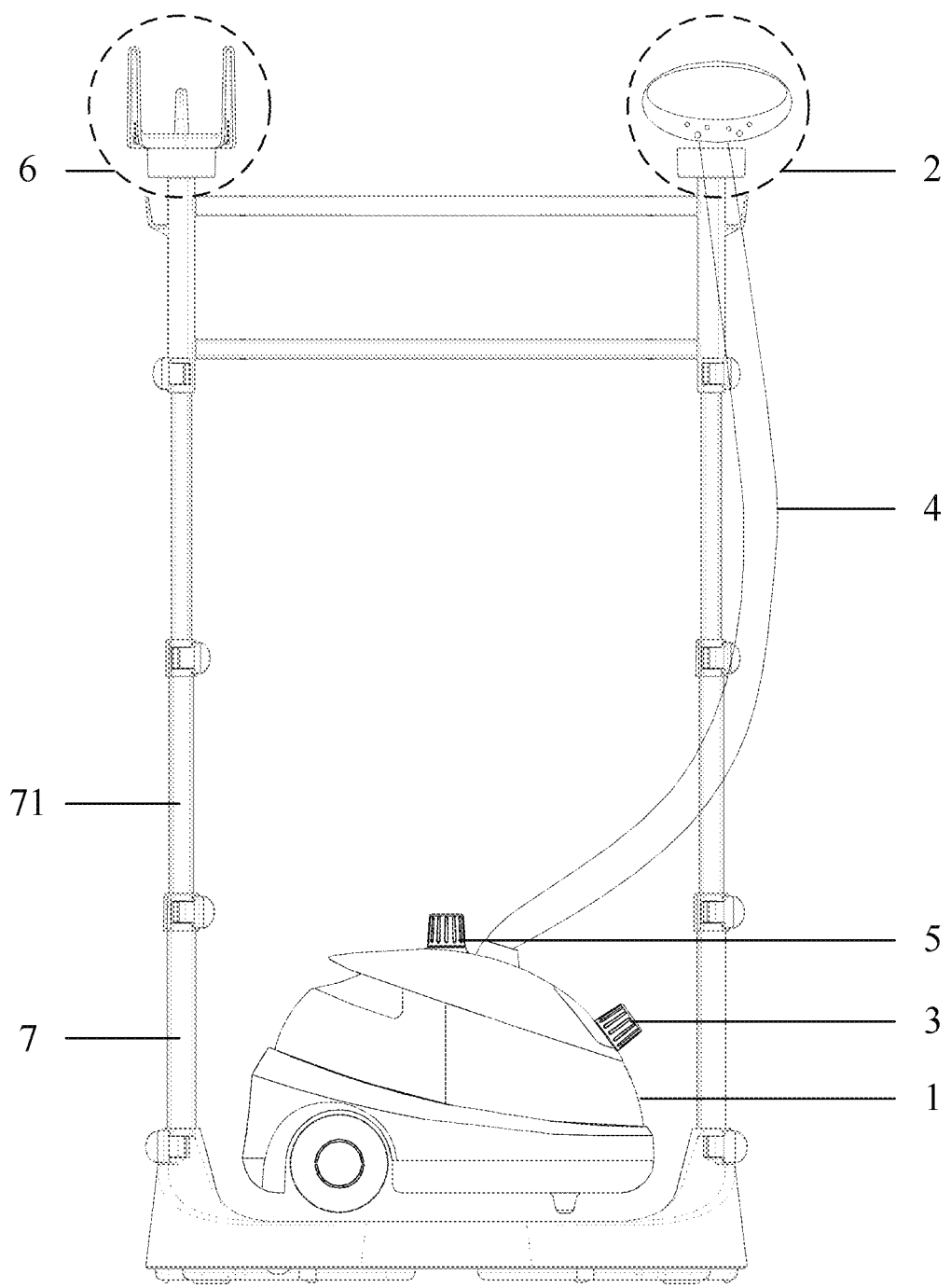
FIG. 1 shows a schematic diagram illustrating a clothing care machine according to an embodiment of the present disclosure.

As shown in FIG. 1, the clothing care machine includes a base, in which a steam generator 1 is provided on the base, a gear adjusting switch 3 and a water inlet 5 is provided on the steam generator 1, and the steam generator 1 is connected to a steam handle 2 through a steam pipe 4. A support frame 7 is provided on both sides of the base separately, a lengthening pole 71 is mounted on the support frame 7, and the two lengthening poles on both sides of the base are provided with a clothes hanger 6 and a support frame 7 separately. The clothes hanger 6 is configured to hang clothing to be ironed. The support frame 7 is configured to place the steam handle 2. The lengthening pole 71 may include a retractable additional support pole or a detachable additional support pole.

Figure 2:
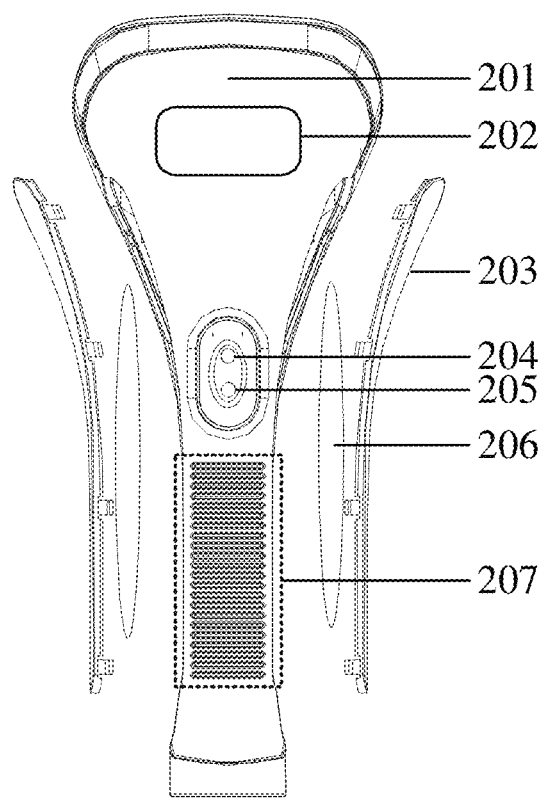
FIG. 2 shows a schematic diagram illustrating a rear side of a steam handle of a clothing care machine according to an embodiment of the present disclosure.
Figure 3:
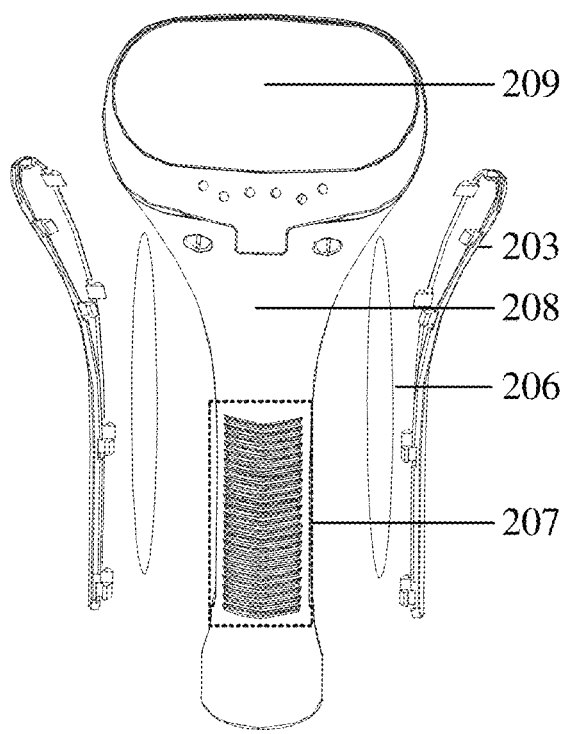
FIG. 3 shows a schematic diagram illustrating a front side of a steam handle of a clothing care machine according to an embodiment of the present disclosure.

As shown in FIG. 2 and FIG. 3, the cover of the steam handle 2 includes an upper cover 201 and a lower cover 208. The control unit 202, the prompting device 204 and the steam handle switch 205 are fixed on the up cover 201. Two fastening structures 203 are provided on a joint part of the upper cover 201 and the lower cover 208 of the steam handle 2. A human body sensing component 206 is provided between the fastening structures 203 and the cover of the steam handle 2. There is also an anti-skidding section 207 provided on the cover of the steam handle 2.

A preferable clothing care machine is provided as a specific embodiment of the present disclosure, and the detail descriptions of the preferable clothing care machine according to the embodiment will be made with reference to FIGS. 1 to 3 as following.

As shown in FIGS. 1 to 3, the clothing care machine according to embodiments of the present disclosure includes: a steam generator 1, configured with a heating driver component; a steam handle 2, configured with a human body sensing component 206, in which the human body sensing component 206 is configured to sense whether the steam handle 2 is operated by a user in real time; a control unit 202, coupled to the steam handle 2 and the heating driver component, and configured to control an operation state of the heating driver component according to a touch signal sensed by the human body sensing component 206 in real time; a wireless communication component (not shown in the figures), coupled between the control unit 202 and the heating driver component via a wireless communication network, and configured to transmit a control instruction from the control unit 202 to the heating driver component.

With clothing care machine according to embodiments of the present disclosure, via providing the human body sensing component 206 on the steam handle 2 and controlling the steam generator 1 by sensing whether the steam handle 2 is operated by the user in real time, a process of intelligent control of the steam generator 1 according to an operation state of the user is controlled to be achieved, and the power consumption and water loss of the clothing care machine are reduced at the same time, and the user operation experience is improved.

Besides, via the wireless communication means added in the clothing care machine, the use of the steam handle 2 may be more convenient and flexible. In particular, no solid circuit is required for communications between the main body of the clothing care machine and the steam handle 2, and the instructions are obtained through the wireless network and sent by the wireless communication component, in which, the wireless communication component may use one of a blue tooth communication component, a Wi-Fi communication component, and a radio frequency communication component and any combination thereof.

In particular, the steam generator 1 is configured to heat water. The human body sensing component 206 on the hand shank 2 may be configured to sense whether a hand of the user is separate from the hand shank 2, and transform the sensed situation to the touch signal. The control unit 202 is configured to send a control instruction of the steam generator 1 according to the duration of the touch signal via the wireless communication component.

Besides, via providing the heating driver component in the steam generator, a rapid heating and break off of the steam generator is achieved, and the power may keep steady, and the reliability of the clothing care machine is increased. In particular, when a control terminal of the heating driver component receives a heating instruction sent by the control unit via the wireless communication component, it heats the steam generator according to a preset power, and when the control terminal of the heating driver component receives a stop heating instruction sent by the control unit via the wireless communication component, it stops heating the steam generator immediately.

Moreover, the clothing care machine according to above embodiments of the present disclosure may have the following additional technical features.

According to an embodiment of the present disclosure, the wireless communication component includes a wireless sending component, a wireless receiving component, and a wireless processing component, in which the wireless communication component includes a radio frequency communication component.

With clothing care machine according to embodiments of the present disclosure, via providing the wireless communication component, the wire restrict between the steam handle 2 and the steam generator 1 is avoided. Besides, since the wireless communication component has a quick speed of sending, receiving and processing information, the instruction transmitting rate between the steam handle 2 and the steam generator 1 is very quick. In particular, when a human body touches the human body sensing component 206 in the steam handle 2, the human body sensing component 206 is triggered to send a trigger signal to the control unit 202 for processing via the radio component via the wireless communication component, thus the user may use the clothing care machine mare convenient and the operation experience is improved.

According to an embodiment of the present disclosure, the control unit 202 is provided with the wireless sending component and the wireless processing component, and the heating driver component is provided with the wireless receiving component.

According to an embodiment of the present disclosure, the control unit 202 is provided with the wireless sending component, and the heating driver component is provided with the wireless processing component and the wireless receiving component.

According to an embodiment of the present disclosure, the control unit 202 is also configured to send a heat preservation instruction to the heating driver component via the wireless communication component so as to control the steam generator 1 to preserve heat.

With the clothing care machine according to embodiments of the present disclosure, via the control unit 202 sending the heat preservation instruction via the wireless communication component to the heating driver component to control the steam generator 1 to preserve heat, the power waste of the steam generator 1 is reduced. In particular, during a process of turning on the clothing care machine and ironing clothing, the user may not keep holding the hand shank of the clothing care machine. If the heating process of the steam generator 1 is stopped as soon as the hand shank of the clothing care machine is put down by the user, the temperature of the steam generator 1 may drop very quickly and this may cause a reheating of the steam generator 1 when the user operates the clothing care machine next time, and may lead to a waste of power consumption.

According to an embodiment of the present disclosure, the control unit 202 includes: a timer coupled to the heating driver component. The timer is configured to count the duration of the touch signal after detecting the touch signal and to trigger the control unit 202 to send the heating instruction via the wireless communication component when determining that the duration of the touch signal is greater than or equal to the first preset touch duration. The timer is also configured to count a free duration when no touch signal has been detected, and to trigger the control unit 202 to send the stop heating instruction via the wireless communication component when determining that the free duration is greater than a second preset touch duration.

With the clothing care machine according to embodiments of the present disclosure, via providing the timer in the control unit 202, the duration of the touch signal that has been received by the control unit 202 may be counted by the timer, and the timer may trigger the control unit 202 to send the heating instruction via the wireless communication component when determining that the duration of the touch signal is greater than or equal to the first preset touch duration. Thus, the duration of the touch signal may be used to exclude a wrong touch signal caused by an accidental touch of the steam handle 2 to be sent via the wireless communication component by the steam handle 2, and the corresponding heating consumption of the steam generator 1 is saved.

Moreover, the first preset touch duration may a default duration of the clothing care machine or may be manually inputted and modified by the user and stored in the control unit 202. When the first preset touch duration is set to be zero by the user, the steam generator 1 may be controlled to heat as soon as the user touches the hand shank of the clothing care machine, and the waiting time of the user is reduced, and the user operation experience is improved.

The free duration when no touch signal has been detected is counted by the timer and sent via the wireless communication component. A free state of the steam handle 2 is determined, and then the timer may trigger the control unit 202 to send the stop heating instruction via the wireless communication component when determining that the free duration of the steam handle 2 is greater than or equal to the second preset touch duration so as to make the steam generator to stop heating, such that the unnecessary power waste is reduced and the safe operation of the clothing care machine is ensured, and the risk of drying out of the water in the steam generator 1 is advantageously reduced.

According to an embodiment of the present disclosure, the timer is also configured to count the free duration when no touch signal has been detected, and to trigger the control unit 202 to send the heat preservation instruction via the wireless communication component when determining that the free duration is less than the second preset touch duration.

With the clothing care machine according to embodiments of the present disclosure, the timer may count the free duration when no touch signal has been detected and determine a free state of the steam handle 2. The timer may trigger the control unit 202 to send the heat preservation instruction to the heating driver via the wireless communication component when determining that the free duration of the steam handle 2 is less than the second preset touch duration so as to make the heating driver device to reduce heat and just keep the temperature of the water in the steam generator 1, thereby the water in the steam generator 1 will stop massive evaporation and the unnecessary water loss is reduced, meanwhile, the clothing care machine doesn't need to reheat when the user operates the clothing care machine after a short time pause, and the power consumption loss of the clothing care machine is reduced.

Moreover, the second preset touch duration may a default time of the clothing care machine or may be manually input and modified by the user and stored in the control unit 202. When the second preset touch duration is set to be relatively long by the user, the hand shank of the clothing care machine may be used as a humidifier.

According to an embodiment of the present disclosure, the steam handle 2 includes: a steam handle switch 205, configured to trigger the human body sensing component 206 to sense whether the steam handle 2 is operated by the user in real time when the mechanical turn-on instruction of the user is obtained; and to trigger the control unit 202 to send the stop heating instruction via the wireless communication component when the mechanical turn-off instruction of the user is obtained.

With the clothing care machine according to embodiments of the present disclosure, via providing the steam handle switch 205 on the steam handle 2, operation requirements of the user may be more adapted. In particular, the steam handle switch 205 may be connected to a power line of the human body sensing component 206 in series. When the steam handle switch 205 is turned on, the human body sensing component 206 is powered on and begins to work for sensing whether the steam handle 2 is operated by the user; when the steam handle switch 205 is turned off, the control unit 202 cannot receive signals from the human body sensing component 206 or receives a mechanical signal of the steam handle switch 205, hence sends the stop heating instruction to the heating driver device via the wireless communication component.

According to an embodiment of the present disclosure, the system further includes: a prompting device 204, provided with a prompting lamp and/or a prompting sound assembly, and configured to prompt the steam generator 1 in a heating state to the user when a heating instruction is obtained, and to prompt the steam generator 1 in a stop heating state to the user when a stop heating instruction is obtained, also to prompt the steam generator 1 in a heat preservation state to the user when a heat preservation instruction is obtained.

With the clothing care machine according to embodiments of the present disclosure, via providing the prompting device 204 in the clothing care machine, an operation state of the clothing care machine is prompted to the user, and a threat to the personal security of the user that may be caused by the clothing care machine is reduced. In particular, the prompting device 204 may be a prompting light device or a prompting sound device, for example, prompting lights are provided in the clothing care machine, in which one set of light(s) is heating prompting light, and one set of light(s) is heat preservation prompting light. When the steam generator 1 is in a heating state, the heating prompting light is on, and the heat preservation prompting light is off; when the steam generator 1 is in a stop heating state, the heating prompting light is off, and the heat preservation prompting light is off; when the steam generator 1 is in a heat preservation state, the heat preservation prompting light is on. For another example, the prompting device 204 is a prompting sound device. The prompting sound device may play at least three kinds of prompting tones, which are a heating prompting tone, a heat preservation prompting tone, and a stop heating prompting tone. The three kinds of prompting tones are played according to three corresponding instructions. The user may come to know a current operation state of the clothing care machine more intuitively through the prompting lights or the prompting tones, and the user operation experience is improved.

According to an embodiment of the present disclosure, the steam handle 2 further includes: a fastening structure 203, provided with the human body sensing component, in which the human body sensing component includes one of an electrical sensor, a pressure sensor, a temperature sensor and an infrared sensor and any combination thereof; a steam pipe 4, coupled between the steam handle 2 and the steam generator 1, and configured to transfer the vapor generated in the steam generator 1 to the steam handle 2 when a heating control component is heating; an ironing board 209, provided with vapor spraying holes, and configured to spray the vapor to a piece of clothing to be ironed.

With the clothing care machine according to embodiments of the present disclosure, in particular, the human body sensing component may detect an operation state of the user via one of an electrical sensor, a pressure sensor, a temperature sensor and an infrared sensor and any combination thereof.

In particular, the test process with different kind of sensors adopted in the human body sensing component 206 is described as following.

The steam pipe 4, with one end connected to the steam generator 1, and another end connected to the steam handle 2, is configured to transfer the vapor. The ironing board 209 is provided with vapor spraying holes on it, and all the vapor spraying holes are connected to the steam pipe 4.

(1) When the electrical sensor is used to sense the user in the human body sensing component, one end of the electrical sensor is connected to a pin of the control unit 202, and when the human body touches the electrical sensor, a change of the electric potential signal is received by the control unit 202.

(2) When the pressure sensor is used to sense the user in the human body sensing component, the pressure sensor may change resistance according to a press condition, and a change of the current passing through the pressure sensor is received by the control unit 202.

(3) When the temperature sensor is used to sense the user in the human body sensing component, a change of the temperature signal is received by the control unit 202.

(4) When the infrared sensor is used to sense an operation state of the user in the human body sensing component, the infrared sensor may send a detecting signal to the control unit 202 according to a determination of a distance or position condition of the user via the wireless communication component.

According to an embodiment of the present disclosure, the steam handle 2 further includes an anti-skidding section 207 which provided on a user hand holding part of the steam handle 2.

With the clothing care machine according to embodiments of the present disclosure, via providing the anti-skidding section 207, when the user holds the steam handle 2, a fall or damage situation of the steam handle 2 caused by lack of friction force may be avoided. In particular, the anti-skidding section 207 may be a rubber sleeve covered around the steam handle 2 or a rubber paster stuck on the steam handle 2, or may also be salient dots or concave-convex bars provided on the steam handle 2.

According to an embodiment of the present disclosure, a power supply battery component is provided in the steam handle 2. The power supply battery component includes a battery placement part. The battery placement part is configured to place a battery and to supply power to the steam handle 2.

With the clothing care machine according to embodiments of the present disclosure, via providing the power supply battery component in the steam handle 2, a limit of coupling the steam handle 2 and the power frequency source only through entity wire is avoided, the operation of the steam handle 2 is more flexible and convenient, and the user operation experience is improved. In particular, the power supply battery component may be one of a 5V battery component, a 12V battery component, a rechargeable battery component and a button battery component and any combination thereof.

According to an embodiment of the present disclosure, the power supply battery component is provided in the steam handle 2. The power supply battery component includes a power frequency source connecting terminal. When the power frequency source connecting terminal is coupled to a power frequency source, the steam handle 2 is powered by the power frequency source.

With the clothing care machine according to embodiments of the present disclosure, via providing the power frequency source connecting terminal in the power supply battery component, on one hand, the steam handle 2 may be powered when there is no power source in the power supply battery component, on the other hand, when a rechargeable battery is placed in the power supply battery component, the rechargeable battery may be charged as while as the steam handle 2 is powered, and when the power frequency source is cut off, the steam handle 2 may switch to be powered by the battery component in the power supply battery component.

According to an embodiment of the present disclosure, the steam handle 2 further includes an electric quantity prompting device. The electric quantity prompting device is configured to prompt an electric quantity of the power supply battery component.

With the clothing care machine according to embodiments of the present disclosure, via providing the electric quantity prompting device in the steam handle 2, a current power usage condition of the power supply battery component is prompted to the user in time, so that the user may choose whether to connect to a power frequency source according to the battery level and the remain working time to keep the operation continuity of the steam handle 2.

According to an embodiment of the present disclosure, the human body sensing component 206 is provided in at least one position of two side parts, a hand holding part, a top part and a bottom part of the steam handle 2.

According to an embodiment of the present disclosure, the human body sensing component 206 is provided in both of two side parts of the steam handle 2 symmetrically.

With the clothing care machine 2 according to embodiments of the present disclosure, via providing the human body sensing component 206 in both of two side parts of the steam handle 2 symmetrically, since the symmetrical positions on the two sides of the steam handle 2 are most easily came into contact with the human hand, the human body sensing component 206 may sense a human signal as soon as the human hand holds the steam handle 2, and use the human signal as a trigger signal to control the steam generator to operate when the accumulating duration of the human signal is greater than or equal to a certain duration, thus when the user holds the steam handle 2, there is no need to touch the human body sensing component 206 in purpose, and the user operation experience is improved.

According to an embodiment of the present disclosure, the human body sensing component 206 is provided in a hand holding part on a lower end of the steam handle 2.

With the clothing care machine 2 according to embodiments of the present disclosure, via providing the human body sensing component 206 in the hand holding part on the lower end of the steam handle 2, when the user holds the steam handle 2, his or her face may be away from the vapor spraying holes (which usually are provided on the inside top part of the steam handle 2) as far as possible, thus the probability of being scalded by vapor caused by misoperation of the end of the steam handle 2 is reduced, the personal security of the user is protected, and the user operation experience is improved.

According to an embodiment of the present disclosure, the human body sensing component 206 is provided with a conductive medium component.

According to an embodiment of the present disclosure, the conductive medium component includes one of a copper sheet, a printed circuit board, a conductive cotton and a conductive aluminum foil and any combination thereof.

With the clothing care machine 2 according to embodiments of the present disclosure, via configuring the electrical sensor with one of the copper sheet, the printed circuit board, the conductive cotton, and the conductive aluminum foil and any combination thereof, the production cost and test sensitivity of the human body sensing component 206 is advantageously reduced. In particular, via providing the conductive aluminum foil and/or the copper sheet at the out side part of the steam handle 2, since a human body is a good conduct and therefore may be considered to be with a potential equal to ground, when the human body touches the conductive aluminum foil and/or the copper of the steam handle 2, the potential of the human body sensing component 206 is changed, and when detecting that the duration of the changed potential is bigger than or equal to the preset touching duration, the steam generator is triggered to operate. Besides, the production of the conductive aluminum foil costs very cheap price and is compatible with current manufacture methods and suitable for technique spreading and quantity production.

As shown in FIG. 1, the clothing care machine includes a base, in which a steam generator 1 is provided on the base, a gear adjusting switch 3 and a water inlet 5 is provided on the steam generator 1, and the steam generator 1 is connected to a steam handle 2 through a steam pipe 4. A support frame 7 is provided on both sides of the base separately, a lengthening pole 71 is mounted on the support frame 7, and the two lengthening poles on both sides of the base are provided with a clothes hanger 6 and a support frame 7 separately. The clothes hanger 6 is configured to hang clothing to be ironed. The support frame 7 is configured to place the steam handle 2.

As shown in FIG. 2 and FIG. 3, the cover of the steam handle 2 includes an upper cover 201 and a lower cover 208. The control unit 202, the prompting device 204 and the steam handle switch 205 are fixed on the upper cover 201. Two fastening structures 203 are provided on a joint part of the upper cover 201 and the lower cover 208 of the steam handle 2. A human body sensing component 206 is provided between the fastening structures 203 and the cover of the steam handle 2. There is also an anti-skidding section 207 provided on the cover of the steam handle 2.

The technical solutions of the present disclosure are illustrated in detail with reference to the drawings, with consideration of the technical problems of how to design a clothing care machine to achieve intelligent control process of the steam generator according to an operation state of a user raised in the related art and to solve the problems, a clothing care machine that may achieve intelligent control process of the steam generator according to an operation state of a user is provided in the present disclosure. With technical solutions of the present disclosure, a process of intelligent control of the steam generator according to an operation state of a user is controlled to be achieved, and the power consumption and water loss of the clothing care machine are reduced at the same time, moreover, a prompting device is added to the clothing care machine, via prompting an operation state of the clothing care machine, a threat to personal security of the user that may be caused by the clothing care machine is reduced.

The technical solutions of the present disclosure are illustrated in detail with reference to the drawings, with consideration of the technical problems of how to design a clothing care machine and its control method to achieve intelligent control process of the steam generator according to an operation state of a user raised in the related art, a method for controlling a clothing care machine, a system for controlling a clothing care machine, and a clothing care machine that may achieve intelligent control process of the steam generator according to an operation state of a user are provided in the present disclosure, via controlling the operation state of the steam generator according to the touch signal detected by the human body sensing component, a process of intelligent control of the steam generator according to an operation state of a user is controlled to be achieved, and the power consumption and water loss of the clothing care machine are reduced at the same time, the user operation experience is improved.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Although explanatory embodiments have been shown and described, the above embodiments cannot be construed to limit the present disclosure, it should be appreciated by those skilled in the art that changes, alternatives and modifications can be made to the embodiments. And any of the modifications, equivalent alternatives, and improvements within the spirit and principle of the present disclosure shall be included in the scope the present disclosure.

What is claimed is:

1. A method for controlling a clothing care machine, wherein the clothing care machine is provided with a steam generator and a steam handle, and the steam handle is provided with a human body sensing component including a pressure sensor, and the method comprises:
controlling, by a processor executing instructions stored in a memory, the human body sensing component to sense whether the steam handle is operated by a user; and
controlling an operation state of the steam generator according to a touch signal sensed by the human body sensing component, including:
in response to receiving a pressure signal from the pressure sensor, determining whether a duration of the pressure signal is longer than or equal to a preset touch duration, wherein the pressure signal comprises at least one of a pressure range signal, a pressure value signal, or a pressure direction signal, and is obtained by the pressure sensor by detecting a size of a region applied with a pressure when the user is handling the steam handle; and
sending a heating instruction to control the steam generator to heat in response to determining that the duration of the pressure signal is longer than or equal to the preset touch duration.

2. The method according to claim 1, wherein, controlling the human body sensing component to sense whether the steam handle is operated by a user comprises:
obtaining a mechanical turn-on instruction of a mechanical switch of the clothing care machine;
triggering the human body sensing component to sense whether the steam handle is operated by the user after the mechanical turn-on instruction is obtained; and the method further comprises:
obtaining a mechanical turn-off instruction of the mechanical switch of the clothing care machine;
controlling the steam generator to stop heating after the mechanical turn-off instruction is obtained.

3. The method according to claim 1, wherein:
the preset touch duration is a first preset touch duration; and
the human body sensing component further comprises an infrared sensor, and controlling the operation state of the steam generator according to the touch signal sensed by the human body sensing component further comprises:
in response to a human characteristic infrared signal being sensed by the infrared sensor, determining whether a duration of the characteristic infrared signal is longer than or equal to a second preset touch duration, wherein the characteristic infrared signal comprises a human temperature infrared signal and/or a human movement infrared signal; and
in response to determining that the duration of the characteristic infrared signal is longer than or equal to the second preset touch duration, sending the heating instruction to control the steam generator to heat.

4. The method according to claim 1, wherein:
the preset touch duration is a first preset touch duration; and
the human body sensing component further comprises an electrical sensor, and controlling the operation state of the steam generator according to the touch signal sensed by the human body sensing component further comprises:
in response to a human electric signal being sensed by the electrical sensor, determining whether a duration of the electric signal is longer than or equal to a second preset touch duration, wherein the electric signal comprises at least one of a human electric potential signal, a human impedance signal, or a human bio-electrical signal; and
in response to determining that the duration of the electric signal is longer than or equal to the second preset touch duration, sending the heating instruction to control the steam generator to heat.

5. The method according to claim 4, wherein, the electrical sensor comprises one of a copper sheet, a printed circuit board, a conductive cotton, and a conductive aluminum foil and any combination thereof, and, the electrical sensor is provided at one or more positions of an out side part, a top part and a bottom part of the steam handle.

6. The method according to claim 1, wherein the preset touch duration is a first preset touch duration;
the method further comprising:
determining whether a free duration within which the steam handle has not been sensed to be operated by any user is longer than or equal to a second preset touch duration;
in response to determining that the free duration is longer than or equal to the second preset touch duration, sending a stop heating instruction to control the steam generator to stop heating; and
in response to determining that the touch duration is longer than or equal to the first preset touch duration and the free duration is longer than or equal to the second preset touch duration, sending a heat preservation instruction to control the steam generator to enter into a standby state of heat preservation.

7. A system for controlling a clothing care machine, wherein the clothing care machine is provided with a steam generator and a steam handle, and the steam handle is provided with a human body sensing component, and the system comprises:
   a processor; and
   a memory for storing instructions executable by the processor,
   wherein:
      the human body sensing component includes a pressure sensor; and
      the processor is configured to:
         control the human body sensing component to sense whether the steam handle is operated by a user;
         in response to receiving a pressure signal from the pressure sensor, determine whether a duration of the pressure signal is longer than or equal to a preset touch duration, wherein the pressure signal comprises at least one of a pressure range signal, a pressure value signal, or a pressure direction signal, and is obtained by the pressure sensor by detecting a size of a region applied with a pressure when the user is handling the steam handle; and
         send a heating instruction to control the steam generator to heat in response to determining that the duration of the pressure signal is longer than or equal to the preset touch duration.

8. The system according to claim 7, wherein the processor is further configured to:
   obtain a mechanical turn-on instruction of a mechanical switch of the clothing care machine;
   trigger the human body sensing component to sense whether the steam handle is operated by the user after the mechanical turn-on instruction is obtained;
   obtain a mechanical turn-off instruction of the mechanical switch of the clothing care machine;
   control the steam generator to stop heating after the mechanical turn-off instruction is obtained.

9. The system according to claim 7, wherein:
   the preset touch duration is a first preset touch duration; and
   the human body sensing component further comprises an infrared sensor, and the processor is further configured to:
      in response to a human characteristic infrared signal being sensed by the infrared sensor, determine whether a duration of the characteristic infrared signal is longer than or equal to a second preset touch duration, wherein the characteristic infrared signal comprises a human temperature infrared signal and/or a human movement infrared signal; and
      send the heating instruction to control the steam generator to heat in response to determining that the duration of the characteristic infrared signal is longer than or equal to the second preset touch duration.

10. The system according to claim 7, wherein:
    the preset touch duration is a first preset touch duration; and
    the human body sensing component further comprises an electrical sensor, and the processor is further configured to:
       in response to a human electric signal being sensed by the electrical sensor, determine whether a duration of the electric signal is longer than or equal to a second preset touch duration, wherein the electric signal comprises at least one of a human electric potential signal, a human impedance signal, or a human bio-electrical signal; and
       send the heating instruction to control the steam generator to heat in response to determining that the duration of the electric signal is longer than or equal to the second preset touch duration.

11. The system according to claim 7, wherein:
    the preset touch duration is a first preset touch duration, and
    the processor is further configured to:
       determine whether a free duration within which the steam handle has not been detected to be operated by any user is longer than or equal to a second preset touch duration;
       send a stop heating instruction to control the steam generator to stop heating in response to determining that the free duration is longer than or equal to the second preset touch duration; and
       send a heat preservation instruction to control the steam generator to preserve heat in response to determining that the touch duration is longer than or equal to the first preset touch duration and the free duration is longer than or equal to the second preset touch duration.

12. The system according to claim 7, further comprising:
    a power supply battery component provided on the steam handle, wherein the power supply battery component comprises:
       a battery placement part, coupled to the steam generator, the steam handle, and the processor, and configured to receive a battery and to supply power to the steam generator, the steam handle, and the processor;
       a power frequency source connecting part, coupled to the battery placement part and configured to charge the battery;
       an electric quantity detecting component, coupled to the battery placement part and configured to detect an electric quantity of the battery; and
       an electric quantity prompting component, coupled to the electric quantity detecting component and configured to prompt an electric quantity according to a detecting result of the electric quantity detecting component.

13. The system according to claim 7, further comprising:
    a heating driver component, coupled to the processor and the steam generator respectively, and configured to obtain the heating instruction of the processor to control the steam generator to heat, and to obtain a stop heating instruction of the processor to control the steam generator to stop heating;
    wherein the processor is further configured to send a heat preservation instruction to the heating driver component so as to control the steam generator to preserve heat.

14. The system according to claim 8, wherein, the steam handle comprises:
    a steam handle switch, configured to trigger the human body sensing component to sense whether the steam handle is operated by the user when the mechanical turn-on instruction of the user is obtained; and to trigger the processor to send a stop heating instruction when the mechanical turn-off instruction of the user is obtained.

15. The system according to claim 7, further comprising:
    a prompting device, provided with a prompting light and/or a prompting sound assembly, and configured to prompt the steam generator in a heating state to the user when the heating instruction is obtained, and to prompt the steam generator in a stop heating state to the user when a stop heating instruction is obtained, and to prompt the steam generator in a heat preservation state to the user when a heat preservation instruction is obtained.

16. The system according to claim 13, further comprising:
a wireless communication component, coupled between the processor and the heating driver component via a wireless communication network, and configured to transmit a control instruction from the processor to the heating driver component.

17. The system according to claim 7, wherein the duration of the pressure signal is counted by a timer in response to receiving the pressure signal.

18. The system according to claim 7, wherein the pressure signal comprises the pressure direction signal.

19. A clothing care machine, comprising:
a steam generator;
a steam handle including a human body sensing component, the human body sensing component including a pressure sensor; and
a system for controlling the clothing care machine, wherein the system comprises:
 a processor; and
 a memory for storing instructions executable by the processor, wherein the processor is configured to:
  control the human body sensing component to sense whether the steam handle is operated by a user;
  in response to receiving a pressure signal from the pressure sensor, determine whether a duration of the pressure signal is longer than or equal to a preset touch duration, wherein the pressure signal comprises at least one of a pressure range signal, a pressure value signal, or a pressure direction signal, and is obtained by the pressure sensor by detecting a size of a region applied with a pressure when the user is handling the steam handle; and
  send a heating instruction to control the steam generator to heat in response to determining that the duration of the pressure signal is longer than or equal to the preset touch duration.

20. The clothing care machine according to claim 19, wherein the steam handle further comprises:
a fastening structure, provided with the human body sensing component, wherein the human body sensing component further comprises at least one of an electrical sensor, a temperature sensor, or an infrared sensor;
a steam pipe, coupled between the steam handle and the steam generator, and configured to transfer vapor generated in the steam generator to the steam handle when a heating processor is heating; and
an ironing board, provided with vapor spraying holes, and configured to spray vapor to a piece of clothing to be ironed.

* * * * *